Patented Aug. 21, 1945

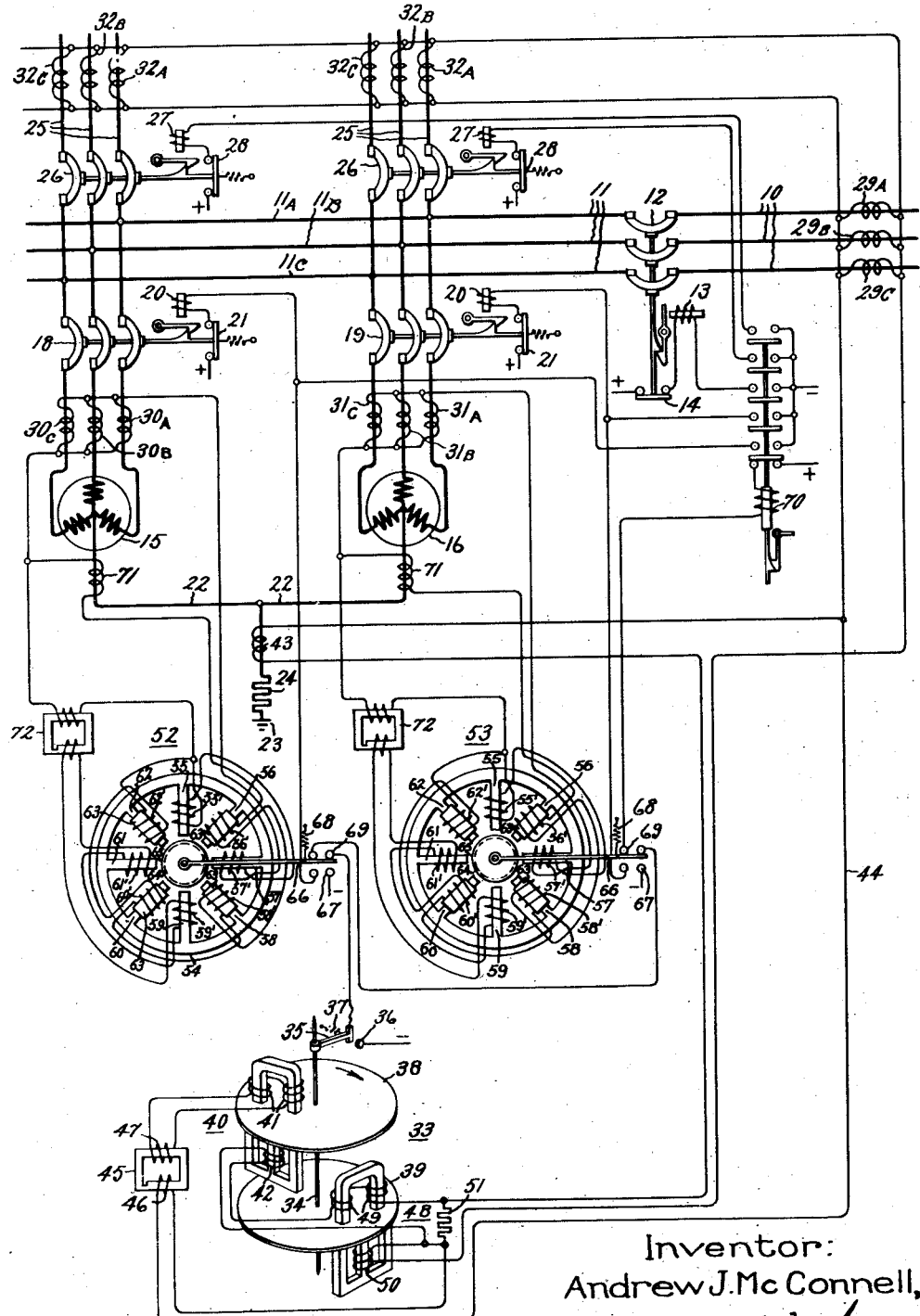

2,383,329

UNITED STATES PATENT OFFICE 2,383,329

PROTECTIVE SYSTEM

Andrew J. McConnell, Albany, N. Y., assignor to General Electric Company, a corporation of New York Application September 23, 1942, Serial No. 459,353

15 Claims. (Cl. 175—294)

My invention relates to protective systems and it has particular relationship to ground fault differential protective systems such as might be employed for protecting power station buses. Specifically my invention is an improvement on the copending application of John H. Neher Serial No. 442,883 filed May 14, 1942, now Patent No. 2,360,151 granted October 10, 1944, and assigned to the same assignee as the present application.

Differential protection of buses, for example, against both ground faults and phase faults has been used successfully for some time, particularly on solidly grounded systems. However, it has been discovered that ground faults on solidly grounded systems, often entail such large current values that considerable damage is done and to this end a grounding impedance has been employed which may be either a resistance or a reactance to limit the current which may flow in the event of ground faults.

If the ground fault current is limited or greatly reduced by a ground fault impedance, then two distinct fault current levels may be involved for the complete protection of a power bus, one for phase faults and another for single phase-to-ground faults. It will be obvious that if a ground fault impedance is used substantially limiting the ground current which may flow, a relatively sensitive differential ground fault relay must be utilized to provide differential ground fault protection for the bus. Heretofore, the use of a sensitive differentially connected ground fault relay has been objectionable due to the possibility of its operation on false differential currents which may appear on through or external faults due to current transformer breakdown or errors in the transformers. Since the false differential current on through-phase faults enters the differentially connected ground relay from one side only, the percentage restrainst which can be successfully applied to phase relays to prevent false operation thereof under such conditions is inapplicable and it is necessary to resort to complicated means or arrangements for preventing false operation or else to dispense with ground fault protection entirely as is sometimes the case.

It would be desirable to provide a differential ground fault relay in which operation on internal ground faults would be insured under all conditions, and furthermore no operation on external ground faults or faults not involving ground would result.

Accordingly, it is an object of my invention to provide a new and improved ground fault differential relay which will operate correctly under substantially all fault conditions.

It is another object of my invention to provide a new and improved ground fault differential protective system in which no operating torque is produced unless an actual ground fault exists on the system being protected.

Still another object of my invention is to provide a ground fault protective system in which a ground fault relay is provided including means for producing an operating torque and means for producing a restraining torque which means are so arranged that false operation of the ground fault relay is eliminated.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which the single figure thereof illustrates schematically a differential ground fault protective system embodying my invention.

Referring now to the drawing, I have illustrated my invention as applied to a polyphase alternating current sectionalized bus system of which only two sections 10 and 11 are schematically illustrated. The bus section 10 is shown as interconnected with bus section 11 through suitable circuit control devices or switching means such as latched closed circuit breaker 12 including a trip-coil 13 and an auxiliary switch 14 which is closed when the circuit breaker is closed and opened when the circuit breaker is opened. Such auxiliary switches are commonly known as "a" switches. In the interest of simplicity in the drawing, neither the bus section 10 nor 11 is shown completely, although section 11 with which my protective system is especially concerned is substantially completely shown except for the provision of a circuit-interrupting means at the left hand end thereof substantially identical with circuit breaker 12 for interconnecting section 11 with an adjacent section not shown.

Although I have illustrated my invention as specifically applied to a bus system, it will be understood by those skilled in the art that other applications are also possible, the bus system having been chosen by way of example only. Bus section 11 is illustrated as a three-phase bus including phase conductors 11A, 11B, and 11C respectively.

Each bus section such as 11 may have one or more sources of power supply which I have indicated as star or Y-connected generators 15 and 16 connected to bus section 11 through switching means such as latched-closed circuit breakers 18 and 19 respectively, each having a trip-coil 20 and an auxiliary or "a" switch 21. The neutrals of the star or Y-connected generators 15 and 16 are each provided with a suitable ground connection 22 which I have illustrated connected to a common ground 23. These ground connections also preferably include a ground fault current-limiting impedance which I have illustrated at 24 as common to both ground connections 22. Impedance 24 has been illustrated as a resistance but it might equally well be a reactance or a combination of resistance and reactance as will be obvious to those skilled in the art. Although I have illustrated power sources 15 and 16 as generators, it should be understood that they could equally well comprise transformers or the like having a suitable ground connection.

My invention, as will become obvious from the description included hereinafter, presupposes that a sufficient amount of ground current for relaying purposes is supplied by a grounding device including a ground connection such as 22 which may be directly associated with the protected section. However, since this is almost always the case, my protective system is substantially universally applicable.

It will be understood that one or more feeders such as 25 will also be connected with bus section 11 through suitable switching means such as latched-closed circuit breakers 26, each having a trip coil 27 and an "a" or auxiliary switch 28.

Since my invention is particularly concerned with differential ground fault protection, I have not illustrated the protective apparatus for bus section 11 necessary to protect it against interphase faults occurring thereon. It should be understood that such a protective system would also be provided except in those cases where the bus section is of the so-called isolated phase type where the possibility of inter-phase short circuits is so remote that a protective system for this purpose might not be necessary.

In order to operate switching means 12, 18, 19, 26 and the switching means, not shown, at the left hand end of section 11, to isolate bus section 11 in the event of a ground-fault thereon, each of the phase conductors of the bus system at either end of protected section 11 is provided with a current transformer. The current transformers associated with the phase conductors of the bus system adjacent the junction between bus sections 10 and 11 are designated as 29A, 29B, and 29C, respectively the subscript denoting the A, B, or C phase conductor with which they are associated. All feeder and supply circuits connected to bus section 11 are also provided with current transformers and, accordingly, as shown in the drawing, current transformers 30A, 30B, and 30C, are provided for the respective phase conductors of the supply circuit by which generator 15 is connected to bus section 11. Similarly current transformers 31A, 31B, and 31C are provided for the respective phase conductors of the supply circuit by which generator 16 is connected to bus section 11. Also current transformers 32A, 32B, and 32C, are provided for the respective phase conductors of each of the feeder circuits 25.

My invention is particularly concerned with protection against ground faults occurring on bus section 11 and, under such a ground fault condition, it is necessary completely to isolate this section from the rest of the system by simultaneously tripping sectionalizing circuit breaker 12 and the circuit breaker, not shown, associated with the left-hand end of bus or line section 11, also circuit breakers 18 and 19 by which generators 15 and 16 are connected to bus system 11, circuit breakers 26 for controlling feeder circuits 25 and any other circuit breakers for controlling source or feeder circuits connected to bus section 11. In view of the ground-fault impedance 24 the ground-fault currents may be reduced so that a sensitive differential ground-fault relay is required and, to this end, I provide an electroresponsive device generally indicated at 33, which is a sensitive differential ground-fault relay constructed and energized in accordance with my invention.

Differential ground-fault relay 33 may be any of the well-known types of differential relays insofar as the general structure is concerned; for example, it may be of the balanced-beam type, of the induction cup type, or, as illustrated the induction-disk type. As will be understood by those skilled in the art, the operating and restraining torques applied to the movable member of an induction-disk type of differential relay may both be applied to a single disk, or as illustrated in the drawing may be applied to separate disks mounted on a common shaft. Accordingly, sensitive differential ground-fault relay 33 is illustrated as comprising a rotatable shaft 34 controlling a movable contact-controlling member 35 adapted to engage a contact 36. As will be described hereinafter, contact-controlling member 35 and contact 36 are connected in a trip-controlling circuit capable of causing simultaneous opening of switching devices such as 12, 18, 19 and 26. A suitable spring 37 is provided for constantly biasing rotatable shaft 34 in such a direction as to move contact controlling member 35 away from contact 36 or, in other words, to tend to maintain the trip-controlling circuit in the open or unenergized condition.

In order that certain torques may be applied to rotatable shaft 34 of sensitive differential ground-fault relay 33 for causing or preventing operation thereof, I have provided a plurality of disks 38 and 39 rigidly attached in spaced relationship to shaft 34. An operating torque for causing contact 36 to be engaged by contact-controlling member 35 in response to a ground-fault on bus section 11 is obtained by means of an operating circuit which controls the energization of a motor element comprising a magnetic structure of the well-known wattmeter type generally indicated at 40 having windings 41 and 42 arranged so as to produce a torque on disk 38 proportional to the product of the currents flowing in windings 41 and 42 and in an operating direction as indicated by the arrow on disk 38. In order to be sure that no operating torque is applied to cause operation of electroresponsive device 33 and consequent isolation of bus section 11 unless an actual ground fault exists somewhere on the system, winding 42 which is hereinafter referred to as a polarizing winding is energized in response to the actual ground current flowing in ground impedance 24 and, to this end, a current transformer 43 is provided, the primary winding of which is connected in series with the ground conductor including ground impedance 24 associated with generators 15 and 16, while the secondary winding is connected to supply polarizing winding 42 with the ground current $I_G$. Since the torque produced by motor element 40 is dependent upon the product of currents flowing in windings 41 and 42, no operating torque will be produced unless a current flows in polarizing winding 42 and, consequently false operation of electroresponsive device 33 on faults not involving ground is completely eliminated.

The windings 41 of the wattmeter type motor element 40 are energized with the differential current $I_D$, which is proportional to the algebraic sum of all the currents entering bus section 11 through all of the normal circuits associated therewith. For the particular circuit illustrated in the drawing the current transformers 29A, 29B, 29C, 32A, 32B, and 32C and the current transformers associated with the left hand end of bus or line section 11, not shown, are connected in parallel with one another and in parallel with the secondary winding of current transformer 43. With this arrangement any differential residual secondary current of the current transformers whether due to an actual fault or due to dissimilarities in the current transformers will flow through a differential circuit including conductor 44 and will energize the windings 41 of motor element 40. For reasons brought out hereinafter a saturating transformer 45 is included in the differential circuit including a primary winding 46 connected in series with differential conductor 44 and a secondary winding 47 connected in series with operating windings 41 of motor element 40.

Theoretically, no differential current should flow through operating windings 41 of motor element 40 unless an actual ground fault occurs on bus section 11 or in either of the two generators 15 and 16. However, as a practical matter, due to ratio errors of the current transformers, or for other reasons, some differential current will flow even under normal conditions, and a large differential current may flow under heavy through fault conditions when it is not desired to isolate bus section 11. As was described above, no operating torque will be provided by motor element 40 unless an actual ground fault occurs. Consequently, only through, or external faults involving ground will cause difficulty in this regard, since even though a differential current flows in operating windings 41, there must also be a polarizing current flowing in polarizing winding 42 before any operating torque on electroresponsive device 33 can be produced. Heretofore differential relays have usually been provided with means for producing a restraining torque for preventing undesirable operation thereof. My invention is particularly concerned with providing a restraining torque different from the restraining torques which have been conventionally used heretofore and more like the restraining torque produced in the phase-fault differential relay disclosed and claimed in my prior copending application Serial No. 403,983 filed July 25, 1941, now Patent No. 2,314,231 granted March 16, 1943, and assigned to the same assignee as the present application. In accordance with the present invention I provide on electroresponsive device 33 a restraining torque motor element 48 associated with induction disk 39 for producing a restraining torque on movable shaft 34 which is proportional to the product of the currents $I_G$, and $I_R$, where $I_G$ is the ground current flowing through ground impedance 24 as reflected in the secondary winding of current transformer 43 and $I_R$ is the residual current equal to the algebraic sum of the currents entering the bus with the exception of the current entering via the neutral impedance 24 and generators 15 and 16, or the resultant current obtained from the parallel connected secondary windings of current transformers 29A, 29B and 29C, 32A, 32B, 32C and the current transformers associated with the left hand end of bus section 11. In other words the restraining torque is proportional to the product of the two currents flowing in the differential circuit. The difference between these currents is, of course, the differential current. By this arrangement, as will be explained hereinafter, a very high restraining torque will be provided under heavy through-ground fault conditions whereas, for internal ground fault conditions, the restraining torque might actually become an operating torque or have zero value depending upon the circuit conditions involved. Thus, although the so-called restraining element may actually produce an operating torque on internal fault conditions, I shall continue to denote it as a restraining element in order to distinguish it from the operating element which, in the prior art relays, is the only element which has torque in the operating direction.

Accordingly, the so-called restraining torque motor-element which comprises element 48 and induction disk 39 is illustrated as of the wattmetric type substantially identical with the motor element 40 including windings 49 and 50 arranged to produce a torque on induction disk 39 proportional to the product of the currents $I_G$, and $I_R$ flowing in windings 49 and 50 respectively. A suitable phase-splitting impedance 51 is provided across windings 49 of motor element 48 and winding 42 of motor element 40, to give the desired phase angle characteristic for substantially optimum torque conditions for each motor element. It will be understood by those skilled in the art that a separate phase-splitting impedance such as 51 could be provided for each motor element 40 and 48. As illustrated, the windings 49 are connected to the secondary winding of current transformer 43 so as to have a current flowing therethrough substantially proportional to the current $I_G$, as reflected in the secondary winding of current transformer 43. Similarly, winding 50 is connected to the output of the parallel-connected secondary windings of the current transformers associated with all the circuits associated with bus section 11 except the circuits connecting generators 15 and 16 thereto, so that the current $I_R$ flows through winding 50.

The electroresponsive device 33 described thus far is substantially fool-proof insofar as false operation thereof is concerned. By virtue of the polarizing winding 42 associated with motor element 40, no operating torque can be produced unless an actual ground fault exists somewhere on the system to produce a current in the secondary winding of current transformer 43. Similarly, by virtue of the restraining motor element 48 on internal fault conditions, zero torque, or an operating torque will be produced therefrom and consequently it is only necessary to produce a high restraining torque relative to the operating torque on external, or through ground fault conditions. By means of saturating transformer 45, the operating torque may be greatly reduced with reference to the restraining torque on such external ground fault conditions which will have no deleterious effect insofar as internal ground faults are concerned because under such conditions, the so-called restraining torque is either zero, or an operating torque. It should be understood by those skilled in the art that instead of providing a separate saturating transformer such as is indicated at 45 a similar effect might be obtained by permitting the magnetic structure of the motor element to saturate under these conditions.

The operation of the differential bus protective system described thus far will be understood by those skilled in the art in view of the detailed description included above. The fact that the restraining torque motor element 48 is designed so that there is no restraint on an internal ground fault, permits a differential relay characteristic of unlimited slope on an external fault. Consequently, the differential circuit or operating circuit may saturate early relative to the product restraint permitting a non-linear relay characteristic of a type unsafe heretofore since the slope can rise very rapidly at the high currents with no danger of failure to operate on an internal fault.

As was mentioned above, my invention may be applied to any circuit or apparatus including a ground connection and is not necessarily limited to the protection of a bus section. Accordingly since generators 15 and 16 are each provided with a ground connection 22, I have illustrated electroresponsive devices 52 and 53 for protecting generators 15 and 16 respectively against ground faults thereon. Since electroresponsive devices 52 and 53 are identical only one of them will be described and the corresponding parts of the other designated by the same reference numerals. Also since my invention is not limited to an induction disk type of electroresponsive device, differential relays 52 and 53 have been illustrated as of the induction cup type preferably similar in construction to the electroresponsive device disclosed and claimed in United States Letters Reissue Patent 21,813 granted May 27, 1941, upon an application of V. E. Verrall and assigned to the same assignee as the present application. As shown in the drawing, electroresponsive device 52 comprises a hollow magnetic stator 54 having a plurality of inwardly projecting salients 55 through 61 inclusive, each provided with a winding designated by the corresponding reference numeral marked with a prime. The salients 56, 58, 60 and 62 are each provided with a copper sleeve 63 around which the respective windings are wound and which function like shading coils. These copper sleeves cause the air-gap flux, between the ends of the inwardly projecting salients and a central magnetic member 64 concentrically positioned with respect to the ends of the salients and forming a part of magnetic stator 54, to lag the total flux including the leakage flux, thereby producing the desired phase shift necessary to satisfactory operation of electroresponsive device 52. The windings 55' through 62' inclusive energize the salients 55 through 62 respectively and also member or stator 64 thereby to actuate a cup-shaped rotor 65 which is movable in the gaps between the salients and the stator 64. Rotor 65 is connected to a contact-controlling member 66 adapted to bridge the normally opened contacts 67 connected in series with the trip coil 22 of circuit breaker 18. A suitable spring 68 is provided for continually biasing contact-controlling member 66 to the open position with respect to contact 67. In order to prevent electroresponsive device 33 from isolating bus section 11 upon the occurrence of a fault in generator 15 electroresponsive device 52 is provided with normally closed contacts 69 serially arranged in the trip-controlling circuit with contact 36 and contact-controlling member 35 of electroresponsive device 33. Similarly electroresponsive device 53 is also provided with normally closed contact 69 connected in the trip-controlling circuit in series with the contact controlling member 35 and contact 36 of electroresponsive device 33 to prevent isolation of bus section 11 when a fault occurs in generator 16. When electroresponsive device 33 operates and the contacts 69 of electroresponsive devices 52 and 53 are both closed, an auxiliary control relay 70 designated as of the hand reset type is energized to close a plurality of contacts which initiate the tripping of all the circuit breakers associated with bus section 11, or in other words, completely isolate bus section 11 from the rest of the system.

The torques applied to rotor 65 of electroresponsive device 52 may be similar to the torques applied to shaft 34 of electroresponsive device 33 by proper energization of the windings 55' to 62' inclusive. Consequently the windings 56', 58', 60' and 62' are polarizing windings and are energized with a current proportional to the current flowing in ground conductor 22 of generator 15 as obtained across the secondary winding of a current transformer 71 associated with this ground conductor. The polarizing windings referred to above function in exactly the same manner as the polarizing winding 42 of motor element 40 and the polarizing windings 49 of motor element 48 of electroresponsive device 33. The operating or differential circuit of electroresponsive device 52 includes a saturating transformer 72 identical with the saturating transformer 45 associated with electroresponsive device 33. The differential current obtained across the circuit comprising the parallel connected secondary windings of current transformers 30A, 30B, and 30C connected in parallel with the secondary winding of current transformer 71, is used to energize the windings 59' and 61' with the differential current $I_D'$. Since the polarizing windings of electroresponsive device 52 are energized with the ground current $I_G'$ flowing in the ground conductor 22, an operating torque on rotor 65 proportional to the product $I_D'I_G'$ will be produced.

In order to obtain a restraining torque proportional to the product of the residual current obtained across the parallel-connected secondary windings of current transformers 30A, 30B, and 30C and the ground current $I_G'$, the windings 55' and 57' are energized with the residual current $I_R'$ whereupon a torque due to the interaction of the fluxes produced by the polarizing windings and windings 55' and 57' is obtained. The energization of the respective windings 55' through 62' inclusive of electroresponsive device 52 is tabulated below as follows:

| Winding | Energizing current |
|---|---|
| 55' | $-I_R'$ |
| 56' | $+I_G'$ |
| 57' | $+I_R'$ |
| 58' | $-I_G'$ |
| 59' | $+I_D'$ |
| 60' | $+I_G'$ |
| 61' | $-I_D'$ |
| 62' | $-I_G'$ |

The operation of the electroresponsive device 52 associated with generator 15 or electroresponsive device 53 associated with generator 16 is substantially identical with the operation of electroresponsive device 33. Either type of device functions equally well insofar as the torque relationships are concerned and consequently the electroresponsive device 33 might just as well comprise a cup-like differential relay such as electroresponsive device 52.

While I have described particular embodiments of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States is:

1. In a differential ground-fault protective system for an alternating-current circuit, a differential circuit associated with said alternating current circuit so that two different currents flow in said differential circuit, a circuit control device, means responsive to a function of the product of a ground current of said system and the differential current of said differential circuit for actuating said control device, and means responsive to said product of the two currents flowing in said differential circuit for opposing the actuation of said control device.

2. In an electroresponsive device for protecting a portion of an alternating-current system having a grounded connection against ground faults thereon, a rotatable member, and means for exerting thereon a torque substantially proportional to the product $I_D I_G$ and an opposing torque substantially proportional to the product of $I_R I_G$ where $I_G$ is the ground current flowing in said grounded connection of said portion of said system, $I_D$ is the differential current and $I_R$ is the sum of all the currents entering said portion of said system except for those currents entering said portion of said system which add up directly to $I_G$.

3. In a protective arrangement for a section of an alternating current system having a neutral point thereof connected to ground, means for obtaining from said system a current proportional to the algebraic sum of the currents entering said portion of said system, a movable member, wattmetric operating means for said member having two cooperating windings respectively energized by currents proportional to said first mentioned current and the actual current flowing in the connection between said neutral point and ground, and wattmetric restraining means for said member having two cooperating windings respectively energized by currents proportional to the actual current flowing in the connection between said neutral point and ground and another current proportional to the difference between said first mentioned current and said actual ground current of said system.

4. In a protective system for an electric circuit, a device to be operated upon the occurrence of a ground fault on said circuit, means responsive to the product of a ground current flowing in said circuit and a current proportional to the difference between the currents entering and leaving said circuit for causing operation of said device, and means responsive to the product of said ground current flowing in said circuit and another current proportional to a predetermined function of said ground and differential currents of said circuit for opposing said first-mentioned means on fault conditions external to said electric circuit.

5. A protective arrangement for an electric circuit comprising a pair of ground fault responsive devices, each designed to protect a different portion of said circuit against ground faults thereon, means including a contact associated with one of said devices for causing isolation upon operation thereof of the portion of said circuit protected by said one device, means including a contact associated with the other of said devices for causing isolation upon operation thereof of the other portion of said circuit protected by said other device, and means associated with said one device and operable upon operation of said one device for preventing effective operation of said other device.

6. In a protective system for an electric circuit having a grounded connection thereon, a device to be operated upon the occurrence of a ground fault on said circuit, means responsive to the product of ground current flowing in said grounded connection and a current proportional to the difference between the currents entering and leaving said circuit for causing operation of said device, means responsive to the product of said ground current and another current proportional to a predetermined function of said ground and differential currents for opposing said first mentioned means on fault conditions external to said electric circuit, and means associated with said first mentioned means for varying the effectiveness thereof under high current external fault conditions.

7. In a protective system for an electric circuit, having a ground connection thereon, a device to be operated upon the occurrence of a ground fault on said circuit, means responsive to the product of the ground current flowing in said ground connection and a current proportional to the difference between the currents entering and leaving said circuit for causing operation of said device, means responsive to the product of said ground current and another current proportional to the difference between said first mentioned current and said ground current for opposing said first mentioned means on fault conditions external to said electric circuit and saturating means associated with said first mentioned means for varying the effectiveness thereof under high current external fault conditions.

8. In a differential ground fault protective system for an alternating current circuit, a differential circuit associated with said alternating current circuit so that two different currents flow in said differential circuit, a circuit control device, means responsive to a function of the product of a ground current and the differential current of said differential circuit for actuating said control device, means responsive to the product of said two currents flowing in said differential circuit for opposing the actuation of said control device, and saturable means for rendering said first mentioned means less effective on high current external fault conditions.

9. In a differential ground fault protective system for an alternating current circuit, a differential circuit associated with said alternating current circuit so that two different currents flow in said differential circuit, an electroresponsive device including a plurality of windings associated with a movable contact controlling member, means for energizing certain of the windings of said electroresponsive device so as to produce a torque on said contact controlling member proportional to a function of the product of a ground current of said alternating current circuit and the differential current of said differential circuit, and means for energizing certain other of said windings so as to produce an opposing torque on said contact controlling member responsive to the product of said two currents flowing in said differential circuit.

10. In a differential ground fault protective system for an alternating current circuit, a differential circuit associated with said alternating current circuit so that two different currents flow in said differential circuit, an electroresponsive device including a plurality of windings associated with a movable contact controlling member, means for energizing certain of the windings of said electroresponsive device so as to produce a torque on said contact controlling member proportional to a function of the product of a ground current of said alternating current circuit and the differential current of said differential circuit, means for energizing certain other of said windings so as to produce an opposing torque on said contact controlling member responsive to the product of said two currents flowing in said differential circuit, and means for rendering said first mentioned torque relatively less effective on high current external fault conditions.

11. In a ground fault protective system for an alternating current circuit, a device to be operated upon the occurrence of a ground fault on said alternating current circuit, a differential circuit associated with said alternating current circuit so that two different currents flow in said differential circuit, means responsive to the difference between said two currents flowing in said differential circuit for causing operation of said device, and means responsive to the relative direction of flow of said two currents for opposing said first mentioned means on fault conditions external to said alternating current electric circuit.

12. In a ground fault protective system for an alternating current electric circuit having a ground connection thereon, a device to be operated upon the occurrence of a ground fault on said circuit, a differential circuit associated with said alternating current circuit so that two different currents flow in said differential circuit, one of the two currents flowing in said differential circuit being proportional to the ground current flowing in said ground connection, means responsive to the product of said ground current and the differential current flowing in said differential circuit for causing operation of said device, and means responsive to the relative direction of flow of said two currents flowing in said differential circuit for opposing said first mentioned means on ground fault conditions external to said electric circuit.

13. In a ground fault protective system for an alternating current electric system having a ground connection thereon, a differential circuit associated with said alternating current circuit so that two different currents flow in said differential circuit, one of the two currents flowing in said differential circuit being proportional to the ground current flowing in said ground connection, operating means energized in accordance with the difference between the two currents flowing in said differential circuit and means responsive to the product of said two currents flowing in said differential circuit for modifying the operation of said last mentioned means.

14. In a protective arrangement for a section of an alternating current system having a neutral point thereof connected to ground, means for obtaining from said system a current proportional to the algebraic sum of the currents entering said portion of said system, means for deriving from said system under ground fault conditions a current having a phase relationship with respect to the ground current flowing between said neutral point and ground which depends upon the location of the ground fault on said system, a movable member, wattmetric operating means for said member having two cooperating windings respectively energized by currents proportional to said first mentioned current and the actual current flowing in the connection between said neutral point and ground, and wattmetric restraining means for said member having two cooperating windings respectively energized by currents proportional to the actual current flowing in the connection between said neutral point and ground and said current derived from said system.

15. In a protective arrangement for an alternating current circuit, means for obtaining a current which is proportional to a ground fault current flowing into said circuit, a movable member, means for exerting on said member a torque proportional to a function of said current, and means for exerting on said member another torque proportional to a function of the product of the ground fault currents at different predetermined points of said circuit and the phase relation between said ground fault currents.

ANDREW J. McCONNELL.